UNITED STATES PATENT OFFICE 2,464,260

QUATERNARY AMMONIUM HALIDES OF BENZHYDRYL ETHER DERIVATIVES

George Rieveschl, Jr., Grosse Pointe Woods, Mich., assignor to Parke, Davis & Company, Detroit, Mich., a corporation of Michigan No Drawing. Application April 8, 1946, Serial No. 660,407

10 Claims. (Cl. 260—471)

This invention relates to new quaternary ammonium halides and to methods of obtaining the same. More particularly, the invention relates to compounds of the general formula,

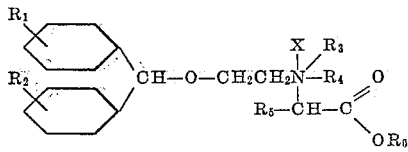

where $R_1$ and $R_2$ are the same or different substituents and represent hydrogen, an alkyl radical containing 1 or 2 carbon atoms or an alkoxy radical containing 1 or 2 carbon atoms, $R_3$ and $R_4$ are the same or different alkyl radicals containing 1 to 3 carbon atoms inclusive or $R_3$ and $R_4$ taken with —N< may be a saturated six-membered heterocyclic ring such as piperidine, a methyl substituted piperidine, morpholine, a methyl substituted morpholine, thiomorpholine and the like, $R_5$ is a hydrogen, phenyl or a lower alkyl radical, $R_6$ is an alkyl radical containing 1 to 10 carbon atoms inclusive, a phenyl radical, a phenyl radical substituted on a carbon thereof by a halogen atom or a lower alkyl or lower alkoxy radical, an aralkyl radical, an aralkyl radical wherein the phenyl ring is substituted on a carbon atom thereof by a halogen atom or a lower alkyl or lower alkoxy radical and X is a chlorine, bromine or iodine atom.

I have found that the new compounds of the present invention may be prepared in almost quantitative yields by the reaction of a halo acetic acid ester compound of the formula,

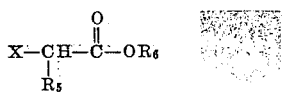

with a β-aminoethyl benzhydryl ether compound of the formula,

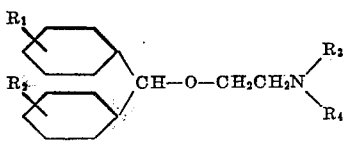

where $R_1$, $R_2$, $R_3$, $R_4$, $R_5$, $R_6$ and X have the same significance as given above.

The reaction is preferably carried out in a substantially anhydrous, inert organic solvent. Some examples of the solvents which I have found to be suitable as reaction mediums are ether, chloroform, carbon tetrachloride, benzene, toluene, xylene, methanol, ethanol, isopropanol, n-propanol, acetone, ethyl acetate, acetonitrile, nitromethane and the like. In most instances, the product separates from the reaction mixture in crystalline form and requires little or no further purification. However, when an alcohol such as methanol, ethanol, isopropanol and the like is used as a solvent, the reaction product is soluble in the solvent if too much solvent has been used. In this case the product may either be crystallized directly from the reaction mixture by evaporation of some of the solvent or it may be precipitated from the reaction mixture by the addition of another solvent in which the product is insoluble, e. g. ether, acetone, chloroform, ethyl acetate and the like.

The compounds of the present invention are very useful and safe curariform agents. The safety margin, e. g. difference between the therapeutic and toxic doses, of these compounds is much greater than that of the natural curare alkaloids such as d-tubocurarine chloride. These new compounds find particular use as an adjunct to anesthesia in abdominal surgery and also in the inhibition of spasms of the skeletal muscles during electric, metrazole or insulin shock treatments of certain types of insanity. They may be administered by the parenteral routes. The parenteral dose is only about 20 to 40 mg. For example, the compound shown in Example 2, β-benzhydryloxyethyl dimethyl carbobutoxymethyl ammonium chloride is customarily administered in a dose of 30 mg. by the parenteral route, preferably intravenously.

The invention is illustrated by the following examples.

*Example 1.* — *β-Benzhydryloxethyldimethylcarbethoxymethyl ammonium bromide*

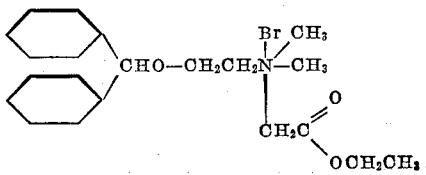

184 g. of ethyl bromoacetate is added slowly with stirring to a refluxing solution of 255 g. of β-dimethylaminoethyl benzyhydryl ether in 500 cc. of ethyl acetate. After all the bromo ester has been added the reaction mixture is refluxed for one and one-half hours, cooled and the crystalline β-benzhydryloxyethyl dimethyl carbethoxymethyl ammonium bromide removed by filtration. The crude product is washed with ethyl acetate and purified by recrystallization from absolute ethanol-ethyl acetate mixture; M. P. 178–179° C.

By using an equivalent amount of ethyl chloroacetate in the above procedure instead of the ethyl bromoacetate, one obtains β-benzhydryloxyethyldimethylcarbethoxymethyl ammonium chloride; M. P. 177° C. Likewise, when one uses the methyl ester of chloracetic acid in this procedure, β - benzhydryloxyethyldimethylcarbomethoxymethyl ammonium chloride, M. P. 163.5–164.5° C., is obtained.

*Example 2.—β-Benzhydryloxyethyldimethyl carbobutoxymethyl ammonium chloride*

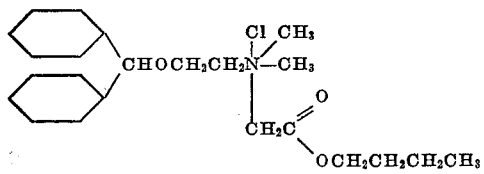

A mixture consisting of 200 g. of β-dimethylaminoethyl benzhydryl ether and 130 g. of n-butyl chloroacetate in 750 ml. of benzene is refluxed for two hours, cooled and the crystalline product removed by filtration. The crude β-benzhydryloxyethyl dimethyl carbobutoxymethyl ammonium chloride is washed with benzene and purified by recrystallization from absolute ethanol-acetone mixture; M. P. 179° C.

β-Benzhydryloxyethyl dimethyl carbo-isopropoxymethyl ammonium chloride, M. P. 177° C., may be prepared by following the above procedure but using an equivalent amount of the isopropyl ester of chloroacetic acid instead of the ethyl ester.

*Example 3.—β-Benzhydryloxyethyl dimethyl α-carbethoxyethyl ammonium bromide*

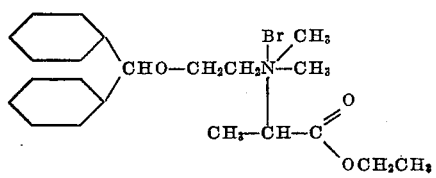

137 g. of ethyl α-bromopropionate is added dropwise to a stirred and refluxing solution of 175 g. of β-dimethylaminoethyl benzhydryl ether in 500 cc. of di-isopropyl ether. After all the halo ester has been added the mixture is refluxed for two hours, cooled and the crystalline product removed by filtration. The crude β-benzhydryloxyethyl dimethyl α-carbethoxyethyl ammonium bromide is washed with several portions of di-isopropyl ether and purified by recrystallization from absolute ethanol-ethyl acetate mixture; M. P. 152–153° C.

*Example 4. — β - Benzhydryloxyethyl dimethyl α-phenylcarbethoxymethyl ammonium bromide*

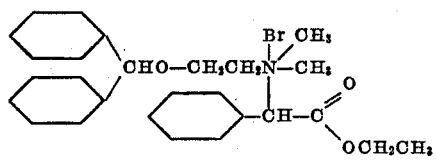

158 g. of ethyl bromophenylacetate is added slowly to a stirred solution of 150 g. of β-dimethylaminoethyl benzhydryl ether in 500 cc. of toluene. After the addition has been completed the mixture is warmed on a steam bath for two hours, cooled and the white crystalline product removed by filtration. The product, β-benzhydryloxyethyl dimethyl α - phenylcarbethoxymethyl ammonium bromide, is washed with ether and purified by recrystallization from absolute ethanol; M. P. 138.5–139.5° C.

*Example 5.—4-(β-Benzhydryloxyethyl)-4-carbethoxymethyl morpholinium bromide*

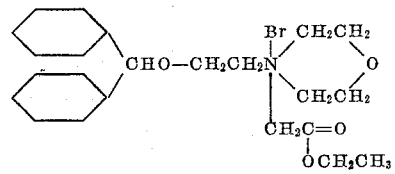

92 g. of ethyl bromoacetate is added slowly to a stirred and refluxing solution of 148 g. of β-N-morpholinylethyl benzhydryl ether in 300 cc. of ethyl acetate and the resulting mixture heated on a steam bath for one hour. The reaction mixture is cooled and the white crystalline 4-(β-benzhydryloxyethyl)-4-carbethoxymethyl morpholinium bromide removed by filtration and purified by recrystallization from absolute ethanol-ethyl acetate mixture; M. P. 194–195° C.

*Example 6.—1-(β-Benzhydryloxyethyl)-1-carbo-n-butoxymethyl piperidinium chloride*

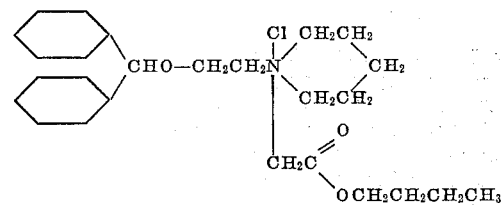

A mixture consisting of 148 g. of β-N-piperidylethyl benzhydryl ether and 83 g. of n-butyl chloro acetate in 300 cc. of n-butanol is stirred and heated on a steam bath for two and one-half hours. After the reaction mixture has cooled, 1 liter of ether is added and the crude 1-(β-benzhydryloxyethyl) - 1 - carbo-n-butoxymethyl piperidinium chloride removed by filtration. The product is washed well with ether and purified by recrystallization from absolute ethanolacetone mixture.

By using an equivalent amount of β-N-3-methylpiperidylethyl benzhydryl ether in the above procedure, one obtains 1-(β-benzhydryloxyethyl)-1-carbo-n-butoxymethyl - 3 - methylpiperidinium chloride.

1 - (β - benzhydryloxyethyl) - 1 - carbethoxymethyl piperidinium bromide, M. P. 176–8° C., is obtained by reacting ethyl bromoacetate with β-N-pipeidylethyl benzhydryl ether in the manner described above.

*Example 7.—β -4,4'-dimethylbenzhydryloxyethyl di-n-propyl - carbo-n-octyloxymethyl ammonium iodide*

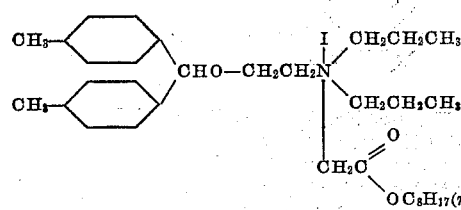

164 g. of n-octyl iodoacetate is added dropwise to a stirred solution of 156 g. of β-di-n-propylaminoethyl 4,4'-dimethylbenzhydryl ether in 500 cc. of toluene. After the addition is complete the mixture is stirred for two hours at room temperature and then warmed on a steam bath for one-half hour. The mixture is cooled and the white crystalline product collected and washed with ether. If desired the crude product may be purified by recrystallization from absolute ethanol-ether mixture.

β-Benzhydryloxyethyl dimethyl carbo-2-ethylhexyloxymethyl ammonium chloride, M. P. 128–9° C., may be obtained in a similar manner by using equivalent quantities of β-dimethylaminoethyl benzhydryl ether and 2-ethylhexyl chloroacetate.

*Example 8.*—β - 2 - methoxybenzhydryloxyethyl methylethyl carbomethoxymethyl ammonium bromide

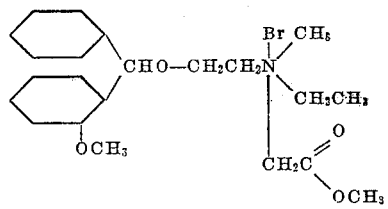

A mixture consisting of 135 g. of β-methylethylaminoethyl 2 - methoxybenzhydryl ether and 77 g. of methyl bromoacetate in 200 cc. of dry methanol is refluxed for two and one-half hours, cooled and the reaction mixture diluted with ether. The crude product is collected, washed with ether and purified by recrystallization from methanolacetone mixture.

*Example 9.*—β-benzhydryloxyethyl dimethyl carbobenzyloxymethyl ammonium chloride

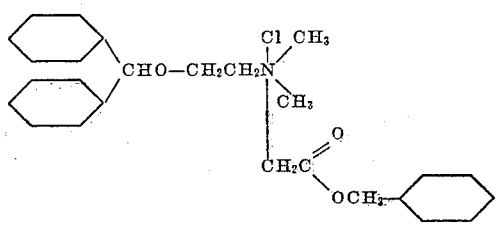

102 g. of benzyl chloroacetate is added slowly to a refluxing solution of 128 g. of β-dimethylaminoethyl benzhydryl ether in 300 cc. of benzene and the resulting mixture refluxed for one and a half hours. The mixture is cooled, and the crystalline product, β-benzhydryloxyethyl dimethyl carbobenzyloxymethyl ammonium chloride, removed by filtration. The crude product after recrystallization from ethanol-ethyl acetate mixture melts at 171–2° C.

The various aminoethyl benzhydryl ethers used as starting materials in the preparation of the new compounds of the present invention may be prepared by any of the various methods described in my copending application, Serial No. 531,639, filed April 18, 1944, now Pat. No. 2,421,714.

What I claim as my invention is:

1. A compound of the formula,

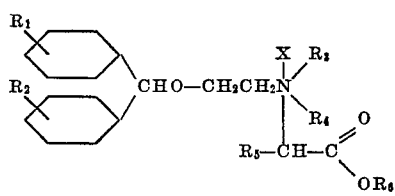

where $R_1$ and $R_2$ are members of the class consisting of hydrogen, alkyl radicals containing 1 to 2 carbon atoms and alkoxy radicals containing 1 to 2 carbon atoms, $R_3$ and $R_4$ are members of the class consisting of alkyl radicals containing 1 to 3 carbon atoms inclusive and further members where $R_3$ and $R_4$ taken with $-N<$ form a saturated six-membered heterocyclic ring, $R_5$ is a member of the class consisting of hydrogen, phenyl and lower alkyl radicals, $R_6$ is a member of the class consisting of alkyl radicals containing 1 to 10 carbon atoms inclusive, and aralkyl radicals and X is a member of the class consisting of chlorine, bromine and iodine atoms.

2. A compound of the formula,

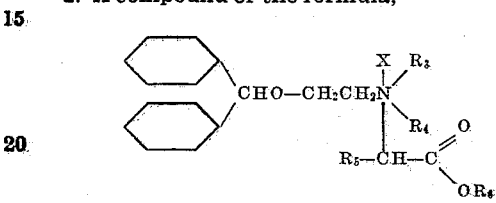

where $R_3$ and $R_4$ are members of the class consisting of alkyl radicals containing 1 to 3 carbon atoms inclusive and further members where $R_3$ and $R_4$ taken with $-N<$ form a saturated six-membered heterocyclic ring, $R_5$ is a member of the class consisting of hydrogen, phenyl and lower alkyl radicals, $R_6$ is an alkyl radical containing 1 to 10 carbon atoms inclusive and X is a member of the class chlorine, bromine and iodine.

3. A compound of the formula,

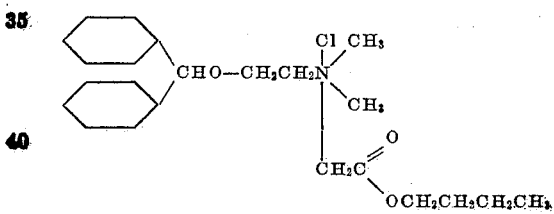

4. A compound of the formula,

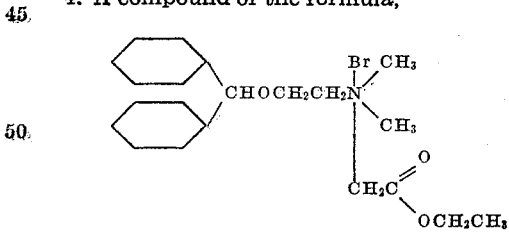

5. A compound of the formula,

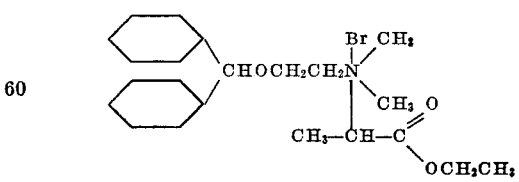

6. Process for obtaining a compound of the formula,

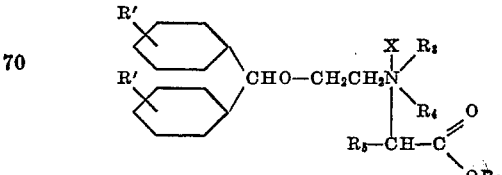

which comprises reacting a compound of the formula,

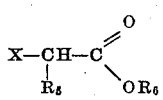

with a compound of the formula,

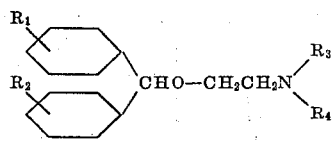

in a substantially anhydrous, inert organic solvent where $R_1$ and $R_2$ are members of the class consisting of hydrogen, alkyl radicals containing 1 to 2 carbon atoms and alkoxy radicals containing 1 to 2 carbon atoms, $R_3$ and $R_4$ are members of the class consisting of alkyl radicals containing 1 to 3 carbon atoms inclusive and further members where $R_3$ and $R_4$ taken with —N< form a saturated six-membered heterocyclic ring, $R_5$ is a member of the class consisting of hydrogen, phenyl and lower alkyl radicals, $R_6$ is a member of the class consisting of alkyl radicals containing 1 to 10 carbon atoms inclusive, and aralkyl radicals and X is a member of the class consisting of chlorine, bromine and iodine atoms.

7. Process for obtaining a compound of the formula,

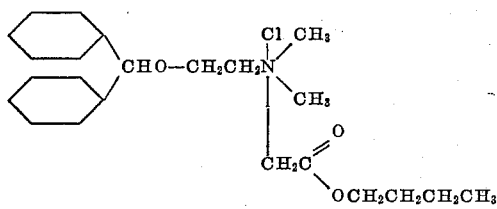

which comprises reacting n-butyl chloroacetate with β-dimethylaminoethyl benzhydryl ether in a substantially anhydrous, inert organic solvent.

8. Process for obtaining a compound of the formula,

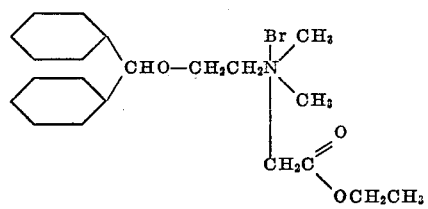

which comprises reacting ethyl bromoacetate with β-dimethylaminoethyl benzhydryl ether in a substantially anhydrous, inert organic solvent.

9. Process for obtaining a compound of the formula,

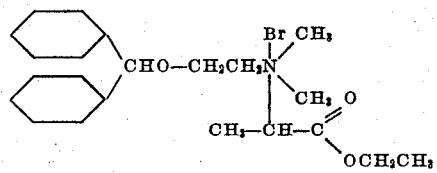

which comprises reacting ethyl α-bromopropionate with β-dimethylaminoethyl benzhydryl ether in a substantially anhydrous, inert organic solvent.

10. A compound of the formula,

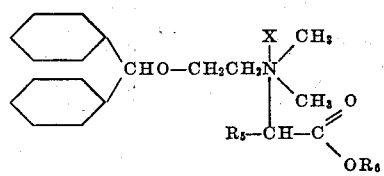

where $R_5$ is a member of the class consisting of hydrogen, phenyl and lower alkyl radicals, $R_6$ is an alkyl radical containing 1 to 10 carbon atoms inclusive and X is a member of the class chlorine, bromine and iodine.

GEORGE RIEVESCHL, JR.

REFERENCES CITED

The following references are of record in the file of this patent:

UNITED STATES PATENTS

| Number | Name | Date |
|---|---|---|
| 1,949,046 | Hartmann et al. | Feb. 27, 1934 |
| 2,297,221 | Huttenlocher | Sept. 29, 1942 |
| 2,387,447 | Hoffmann et al. | Oct. 23, 1945 |

OTHER REFERENCES

Bovet et al.: "Chem. Abstracts," vol. 31 (1937), page 3988.

Dongen: "Chem. Abstracts," vol. 35 (1941), pages 8099–8100.